2,997,515
THERMAL ELECTROMOTIVE FORCE
GENERATOR
Achilles C. Sampietro, Detroit, Mich., assignor to Thompson Ramo Wooldridge Inc., a corporation of Ohio
Original application June 27, 1958, Ser. No. 745,132, now Patent No. 2,937,218, dated May 17, 1960. Divided and this application June 10, 1959, Ser. No. 820,072

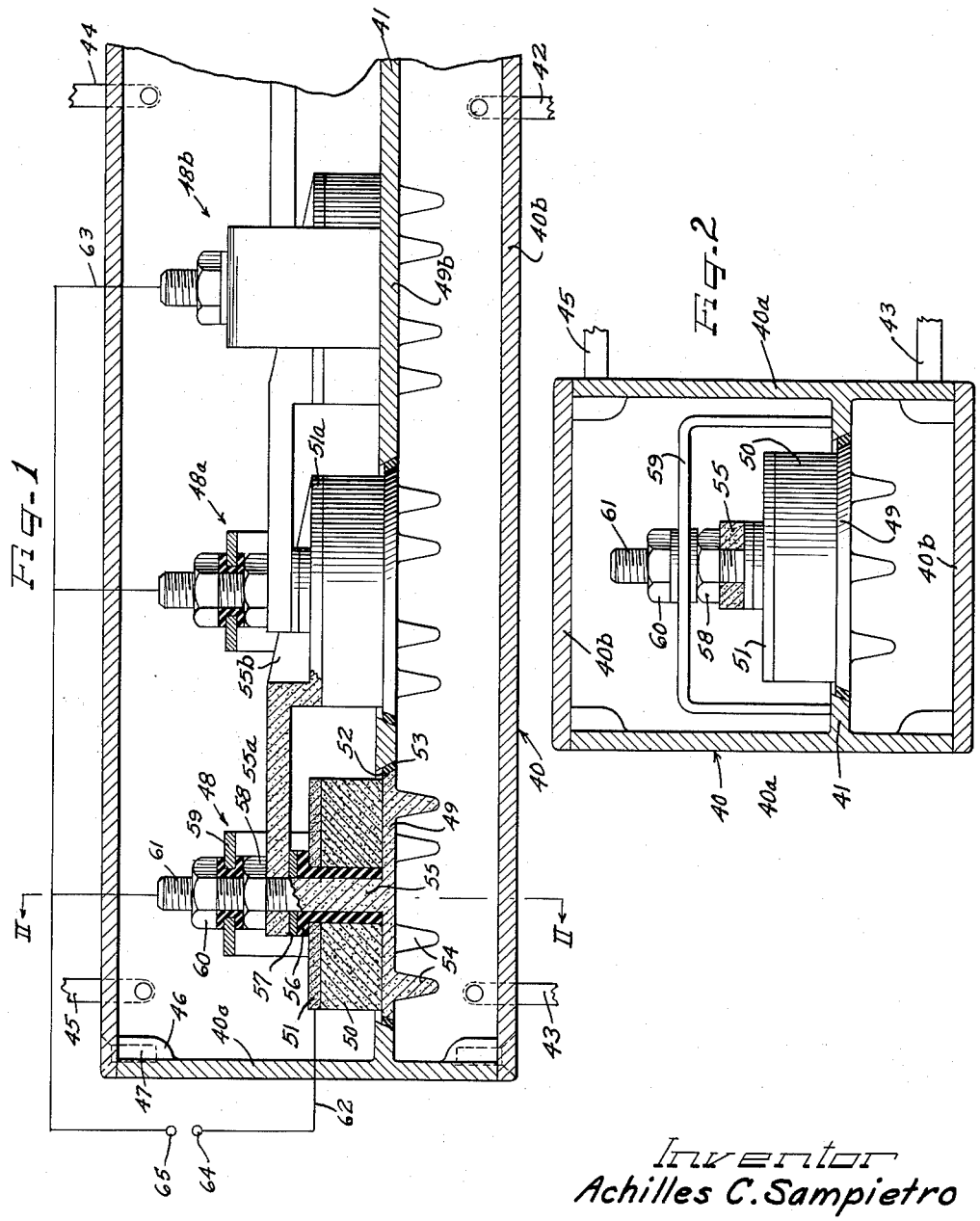

4 Claims. (Cl. 136—4)

This invention relates to a thermal electromotive force generator. More particularly, this invention relates to means for generating electrical power from thermal energy by utilizing the "Peltier" effect wherein an electrical circuit containing two junctions of different electrically conductive materials maintained at different temperature gives rise to an electromotive force. In particular, the invention relates to the use of materials that give relatively high difference of potential for a moderate temperature difference between the hot and cold junctions and to the construction of these materials in a device the structure of which affords optimum economy and efficiency.

This application is a division of my copending application Serial No. 745,132, filed on June 27, 1958, now Patent No. 2,937,218, and entitled "Thermal Electromotive Force Generator."

It is an object of this invention to provide a thermal electromotive force generator.

It is a further object of this invention to provide a thermal electromotive force generator which is compact and economical in construction and highly efficient in operation.

It is a further object of this invention to provide a thermal electromotive force generator in which the heat exchange channels maintaining the temperature difference of the junctions are separated by the electrically conductive materials comprising the generator.

It is a still further object of this invention to provide a thermal electromotive force generator the individual cells or units of which may readily be connected either in electrical series or parallel relationship.

While the novel and distinctive features of the invention are particularly pointed out in the appended claims, a more expository treatment of the invention, in principle and in detail, together with additional objects and advantages thereof, is afforded by the following description and accompanying drawings in which like reference characters are used to refer to like parts throughout and wherein:

FIGURE 1 is a vertical sectional view with certain parts in elevation of my thermal electromotive force generator.

FIGURE 2 is a sectional view with certain parts in elevation taken on the line II—II of FIGURE 1.

The general physical principles of thermo-electricity and the phenomenon of thermal electromotive force generation have been well-known for some time. These general physical principles are, for example, discussed at pages 218 through 226 of a book entitled "Principles of Electricity," by L. Page and N. I. Adams, published by D. Van Nostrand Co., Inc., New York, New York, tenth printing 1944. These physical principles have been most commonly used in thermocouples used to measure temperature rather than to generate useful electrical power. Many attempts have, however, been made to construct thermo-electric batteries or generators which would be sufficiently economical to construct and sufficiently efficient in generating useful quantities of electric power to be commercially practical. It is apparent that a commercially practicable thermal electromotive force generator must be both simple and rugged in construction and capable of producing a reasonable voltage output.

In FIGURES 1 and 2 there is shown a thermal electromotive force generator consisting of a plurality of cells each having two plates of one type of electrically conductive thermoelectric material and an intermediate plate of a second type of such material. By way of example there is listed below the voltage output for each unit of the device using the stated combinations of materials and maintaining a temperature difference of 300° C. between the two junctions of each unit:

| Silicon | Germanium | .20189 volts |
| Silicon | Antimony | .12553 volts |
| Silicon | Iron | .11512 volts |
| Silicon | Chromel | .11941 volts |

Other suitable combinations of materials may, of course, also be found by those skilled in the art.

In FIGURES 1 and 2 there is shown a thermal electromotive force generator which is particularly adapted for electrical series connection of the units thereof. These units are enclosed in a housing 40 comprising side walls 40a and top and bottom walls 40b arranged in a generally rectangular cross section as shown in FIGURE 2. An interior partition 41 extends between the side walls 40a and runs the length of the enclosure between end walls 40c. Partition 41 thus divides the rectangular container into lower and upper chambers. A heating fluid inlet pipe 42 and outlet pipe 43 communicates with the lower chamber whereas a cooling fluid inlet pipe 44 and outlet pipe 45 communicates with the upper chamber. The walls of the chamber may be assembled together in any convenient manner such as by screws 47 seating in bosses 46 at each corner of the enclosure. The material of the walls of the enclosure and of the interior partition is preferably a heat and electrical insulator and may, for example, comprise any suitable plastic or ceramic.

A plurality of thermal pile sandwich units 48, 48a 48b, etc. is mounted upon interior partition 41. Each of the units comprises a first disc 49 of a first electrically conductive material, a second disc 50 of a second electrically conductive material, and a third disc 51 of the same electrically conductive material as the first disc 49.

Disc 49 is a generally conical shaped disc which seats in a conical aperture 52 in partition 41 and is separated from the partition by any suitable insulating material 53. Disc 49 may conveniently be provided with heat exchange fins 54. Disc 49 is also provided at the center thereof with an upwardly extending terminal and assembly post 55 having its upper part exteriorly threaded. The intermediate disc 50 and the top disc 51 are each provided with central apertures through which post 55 extends, post 55 being separated from these discs by an insulating washer 56. A pressure washer 57 seats on top of insulating washer 56 and beneath a member 55a seated on post 55 to form an extension of the terminal post 55. A nut 58 bolts the units together and is positioned as shown in FIGURE 4 on a threaded portion of the upper part of terminal 55. The units are held in the conical seat by a stirrup 59 and a nut 60 on threaded portion 61 of the upwardly projecting terminal 55. Portion 55b of the extension 55a of terminal post 55 from the first plate 49 makes contact with the third plate 51a of the next unit 48b thereby connecting the units in electrical series relationship.

It is thus seen that a first junction will be formed at the interface between discs 49 and 50 which junction will be maintained at a relatively high temperature by the heating fluid flowing into the lower chamber through pipes 42 and flowing out through pipe 43. Similarly, a second junction is formed at the interface between disc 50 and disc 51 which second junction is maintained at a relatively low temperature by the cooling fluid flowing into the upper chamber through pipe 44 and flowing out through pipe 45. Electrical connection may be made by a line 62 to the third disc 51 of the first unit 48 and another electrical connection may be made to the first disc 49b of the last unit of the series as by connecting to the upwardly projecting terminal thereof by a line 63. Lines 62 and 63 are respectively brought out to terminals 64 and 65 between which there will be an electromotive force equal to the sum of the electromotive forces generated by each of the units. This follows from the fact that the units are connected in series by the upwardly projecting terminal 55 and arms 55a and 55b.

While the principles of the invention have now been made clear, there will be immediately obvious to those skilled in the art many modifications in structure, arrangement, proportions, and the elements and components used in the practice of the invention and otherwise, which are particularly adapted for specific environments and operating requirements without departing from those principles. The appended claims are therefore intended to cover and embrace any such modifications within the limits only of the true spirit and scope of the invention.

I claim as my invention:

1. In an electromotive force generator, a sandwich unit comprising first, second and intermediate discs, said first disc being made of a first electrically conductive thermoelectric material and having a flat surface forming a face for confronting one side of said intermediate disc and further including a terminal and assembly post extending away from said face, said second disc and said intermediate disc being centrally apertured and being received on said post, said intermediate disc being made of a second electrically conductive thermoelectric material, an insulating washer interposed between said post and said second and intermediate discs, said second disc being made of said first electrically conductive thermoelectric material and having a flat surface forming a face for confronting the opposite side of said intermediate disc, clamping means including said post clamping said discs tightly together, said clamping means being insulated from said second disc, thereby to form two separate junctions at the respective interfaces between said intermediate disc and said first and second discs, a housing enclosing said sandwich unit, means forming a partition to divide the housing into adjoining chambers, said first disc being seated in an aperture in said partition, and means for supplying heat exchange medium at two different temperatures to the adjoining chambers of the housing to subject said first disc to one temperature and said second disc to a second temperature, thereby to generate an electromotive force at said junctions.

2. A thermal electromotive force generator comprising, a closed casing, an interior partition dividing said casing into first and second chambers, a plurality of thermo-electric generating units in said casing, each of said units comprising first, second and third generally disc shaped members arranged in stacked relationship, said first and third members being composed of a first electrically conductive material, said second member being composed of a second electrically conductive material different from said first member, said first member being seated in an aperture in said partition and electrically insulated therefrom, said first member having an upwardly extending central post portion, said second and third members having central apertures through which said post portion projects, an insulating washer surrounding said post portion to separate it from said second and third members, insulated means coacting with said post portion and said partition to hold said three members in tightly assembled relationship to form a first thermoelectric junction between said first and second members and a second thermo-electric junction between said second and third members, means insulating said third member from said post means to circulate a heat exchange medium through said first chamber to maintain said first junction at a relatively high temperature, means to circulate a heat exchange medium through said second chamber to maintain said second junction at a relatively low temperature, means to connect said central post portion of one of said units to said third member of the next of said units to connect said units in electrical series relationship, and means to derive an electrical output between the third member of the first of said units and the first member of the last of said units.

3. A thermal electromotive force generator comprising, a closed casing, an interior partition dividing said casing into first and second chambers, a plurality of thermoelectric generating units in said casing, each of said units comprising first, second and third electrically conductive plate members arranged in superimposed stacked relationship to each other, said first and third members being composed of a first electrically conductive material, said second member being composed of a second electrically conductive material different from said first material, said first member having tapered sides and being seated in a generally conically shaped aperture in said partition and electrically insulated therefrom, said first member having an upwardly extending central post portion, said second and third members having central apertures through which said post portion projects, an insulating washer surrounding said post portion to separate it from said second and third members, said post portion being provided with an arm section extending away from said post portion and being shaped to make electrical contacts with the third member of an adjacent unit in said generator, means coacting with said post portion and said partition to hold said three members in tightly assembled relationship to form a first thermo-electric junction between said first and second members, and a second thermo-electric junction between said second and third members, means for insulating said third member from said post, means to circulate a heat exchange medium through said first chamber to maintain said first junction at a relatively high temperature, means to circulate a heat exchange medium through said second chamber to maintain said second junction at a relatively low temperature, all of the units in said generator being connected in electrical series circuit relationship by said arm section extending from said post portion of one of said units to said third member of the next of said units, and means to derive an electrical output between the third member of the first of said units and the first member of the last of said units.

4. A thermal electromotive force generator comprising, first, second and third generally disc shaped members arranged in superimposed stacked relationship, said first and third members being composed of a first electrically conductive material, said second member being composed of a second electrically conductive material different from said first material, a partition member having an aperture therein, said partition member being composed of heat insulating material, said first member being seated snugly in said aperture in said partition, said first member having an upwardly extending central post portion, said post portion being provided with an arm section extending away from said unit and insulated from said third member and shaped and adapted to make electrical contact with another similar unit, said second and third members having central apertures through which said post portion projects, means insulating said first member from said partition, an insulating washer surrounding said post portion to separate it from said second and third members, a generally U-shaped bracket rigidly attached to said partition and extending around said unit, means insulating said bracket from said post, screw threaded means coacting with said bracket and said post portion to hold said three members in tightly assembled relationship to form a first thermo-electric junction between said first and second members and a second thermo-electric junction between said second and third members, means to maintain said first junction at a relatively high temperature, means to maintain said second junction at a relatively low temperature, and means to derive an electrical output between said first and third members.

References Cited in the file of this patent

UNITED STATES PATENTS

| | | |
|---|---|---|
| 262,111 | Patterson | Aug. 1, 1882 |
| 394,090 | Woodward | Dec. 4, 1888 |
| 1,848,655 | Petrick | Mar. 8, 1932 |
| 2,289,152 | Telkes | July 7, 1942 |
| 2,597,752 | Salisbury | May 20, 1952 |

FOREIGN PATENTS

| | | |
|---|---|---|
| 83,859 | Germany | Mar. 26, 1895 |
| 371,523 | France | Mar. 9, 1907 |